United States Patent
Wang et al.

(10) Patent No.: US 11,570,011 B2
(45) Date of Patent: Jan. 31, 2023

(54) MULTICAST PACKET HANDLING BASED ON FLOW CACHE INFORMATION

(71) Applicant: VMware, Inc., Palo Alto, CA (US)

(72) Inventors: Dexiang Wang, Sunnyvale, CA (US); Xinhua Hong, Campbell, CA (US); Yong Wang, San Jose, CA (US); Yu Ying, Cupertino, CA (US); Jochen Behrens, Santa Cruz, CA (US)

(73) Assignee: VMWARE, INC., Palo Alto, CA (US)

( * ) Notice: Subject to any disclaimer, the term of this patent is extended or adjusted under 35 U.S.C. 154(b) by 68 days.

(21) Appl. No.: 17/141,226

(22) Filed: Jan. 5, 2021

(65) Prior Publication Data

US 2022/0217006 A1    Jul. 7, 2022

(51) Int. Cl.
*H04L 12/28* (2006.01)
*H04L 12/18* (2006.01)
*H04L 67/568* (2022.01)

(52) U.S. Cl.
CPC ............ *H04L 12/18* (2013.01); *H04L 67/568* (2022.05)

(58) Field of Classification Search
CPC ............................ H04L 12/18; H04L 67/2842
See application file for complete search history.

(56) References Cited

U.S. PATENT DOCUMENTS

| 11,108,686 B1 * | 8/2021 | Thomas | H04L 61/2514 |
| 11,108,687 B1 * | 8/2021 | Hawkins | H04L 47/13 |
| 2021/0329087 A1 * | 10/2021 | Ciraci | H04L 43/026 |

FOREIGN PATENT DOCUMENTS

| WO | WO-2020060775 A1 * | 3/2020 | G06F 9/45558 |
| WO | WO-2020263640 A1 * | 12/2020 | G06F 9/45558 |

* cited by examiner

*Primary Examiner* — Cheikh T Ndiaye
(74) *Attorney, Agent, or Firm* — SU IP Consulting (57) ABSTRACT

Example methods and systems for multicast packet handling based on flow cache information are described. In one example, a network element may configure flow cache information associated with a multicast flow. The flow cache information may specify a set of actions that is configured based on a sequence of function calls. In response to detecting a multicast packet associated with the multicast flow, fast-path processing may be performed based on the flow cache information. This may include executing a replication action to generate a first packet replica and a second packet replica. First processing action(s) may be executed to process the first packet replica to generate and send a first output packet towards a first multicast destination. Second processing action(s) may be executed to process the second packet replica to generate and send a first output packet towards a second multicast destination.

18 Claims, 7 Drawing Sheets

605
```
KEY:
port_id=0, tep_idx=255 num_teps=1, tunnel_ctxt=0x0,
dl_src=00:0c:29:f9:a6:01, dl_dst=01:00:5e:01:04:03,
dl_type=0x800, vlan=100, nw_src=10.1.1.1/32,
nw_dst=239.1.4.3/32, nw_proto=17, nw_ttl=64,
nw_flags=0x0, bundle_version=0,
tp_src=0/0x0, tp_dst=0/0x0, match_type=0x1,
```

610
```
ACTIONS:
mcast_replication n_replicas=2:,
```

620-623
```
IPv4_routing dl_src=c2:81:09:00:00:01,
        dl_dst=01:00:5e:01:04:03, nw_ttl=63:,
geneve nw_src=100.1.1.100, nw_dst=100.1.1.1,
        csum=0x5f35, hdr=0x240655800006500,
        opts=0x104800140000100, ifuid=280:,
IPv4_routing dl_src=c2:81:09:00:00:0a,
        dl_dst=c2:81:09:00:00:0f, nw_ttl=64:,
output port_id=0, vlan_id=11, mtu=1500, tx_cap=0xd:,
```

630-640
```
IPv4_routing dl_src=c2:81:09:00:00:01,
        dl_dst=c2:81:09:00:00:00, nw_ttl=63:,
mcast_replication n_replicas=3:,
```

650-660
```
IPv4_routing dl_src=...,dl_dst=...,nw_ttl=...:,
mcast_replication n_replicas=1:,
```

670-673
```
IPv4_routing dl_src=c2:81:09:00:00:04,
        dl_dst=01:00:5e:01:04:03, nw_ttl=61:,
geneve nw_src=100.1.1.100, nw_dst=100.1.1.1,
        csum=0x5f35, hdr=0x240655800006700,
        opts=0x104800140000100, ifuid=280:,
IPv4_routing dl_src=c2:81:09:00:00:0a,
        dl_dst=c2:81:09:00:00:0f, nw_ttl=64:,
output port_id=0, vlan_id=11, mtu=1500, tx_cap=0xd:,
```

680-683
```
IPv4_routing dl_src=00:00:00:00:00:00,
        dl_dst=01:00:5e:01:04:03, nw_ttl=62:,
geneve nw_src=100.1.1.100, nw_dst=100.1.2.1,
        csum=0x5f34, hdr=0x24065580000c800,
        opts=0x104800110000000, ifuid=281:,
IPv4_routing dl_src=c2:81:09:00:00:0a,
        dl_dst=c2:81:09:00:00:0e, nw_ttl=64:,
output port_id=0, vlan_id=11, mtu=1500, tx_cap=0xd:,
```

690-693
```
IPv4_routing dl_src=00:00:00:00:00:00,
        dl_dst=01:00:5e:01:04:03, nw_ttl=62:,
geneve nw_src=100.1.1.100, nw_dst=239.100.100.100,
        csum=0x9846, hdr=0x24065580000c800,
        opts=0x104800100000000, ifuid=277:,
IPv4_routing dl_src=c2:81:09:00:00:0a,
        dl_dst=01:00:5e:64:64:64, nw_ttl=64:,
output port_id=0, vlan_id=11, mtu=1500, tx_cap=0xd:,
```

694
```
END_MARKER
```

MULTICAST PACKET HANDLING BASED ON FLOW CACHE INFORMATION

BACKGROUND

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines (VMs) running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc. In practice, multicasting refers to the transmission of information from a source to a group of destinations simultaneously. It is desirable to improve the handling of multicast packets in the SDN environment.

BRIEF DESCRIPTION OF DRAWINGS

FIG. 6 is a schematic diagram illustrating example flow cache information that that is configurable using the example in FIG. 5.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

According to examples of the present disclosure, multicast packet handling may be implemented more efficiently based on flow cache information. One example may involve a network element (e.g., EDGE1 210 in FIGS. 1-2) configuring flow cache information (e.g., 240 in FIGS. 1-2) associated with a multicast flow. The flow cache information may specify a set of actions {ACTION-j} that is configured based on a sequence of function calls {CALL-i} that is executable during slow-path processing. In response to detecting a multicast packet associated with the multicast flow, fast-path processing may be performed based on the flow cache information. Examples of the present disclosure should be contrasted against conventional approaches that necessitate slow-path processing for each and every multicast packet. Such conventional approaches lack efficiency and scalability, especially in a large-scale network environment with substantially high multicast traffic volume.

Figure 1:
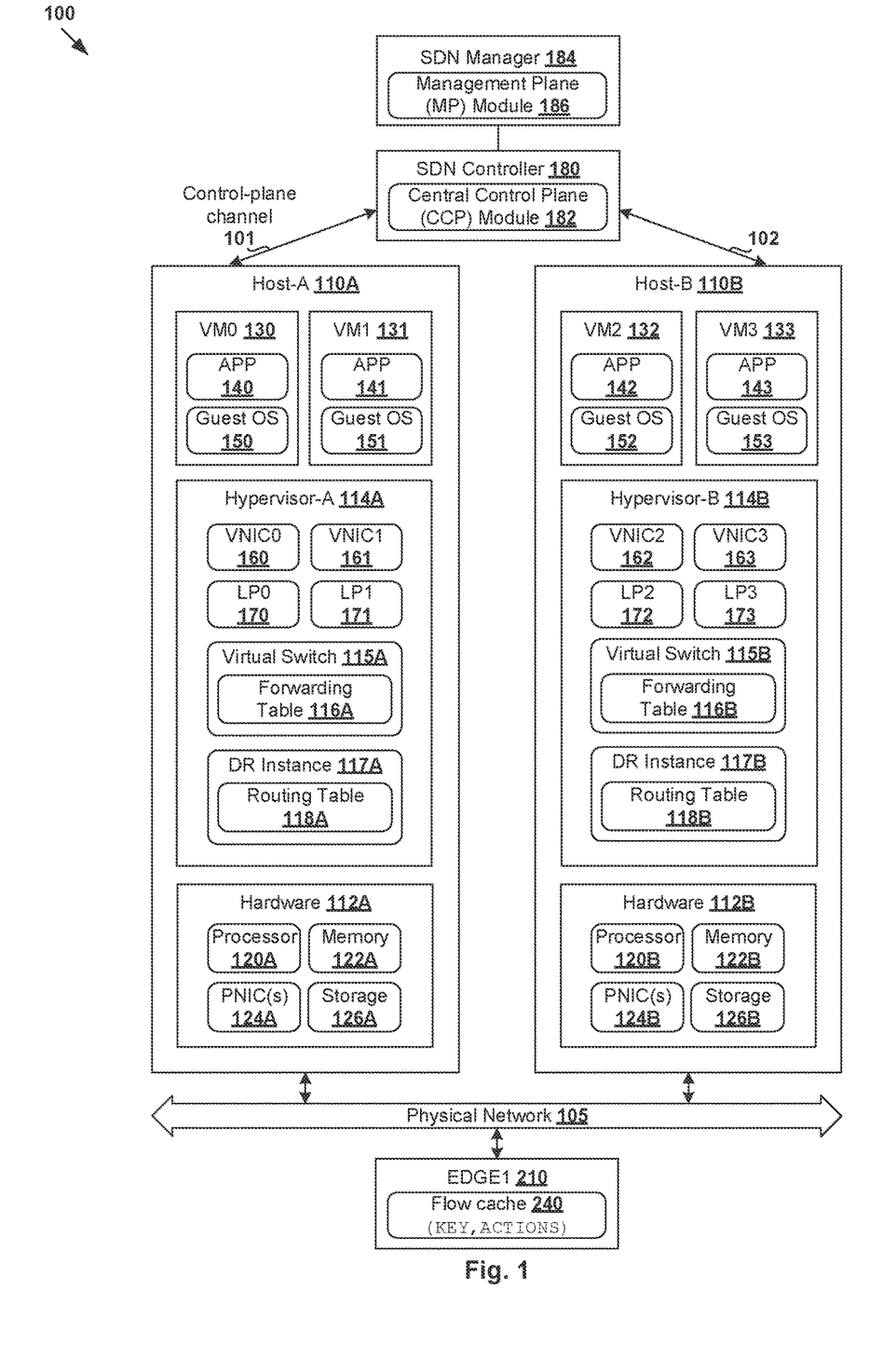
FIG. 1 is a schematic diagram illustrating an example software-defined networking (SDN) environment in which multicast packet handling based on flow cache information may be performed.

In more detail, FIG. 1 is a schematic diagram illustrating example software-defined networking (SDN) environment 100 in which multicast packet handling based on flow cache information may be performed. It should be understood that, depending on the desired implementation, SDN environment 100 may include additional and/or alternative components than that shown in FIG. 1. Although the terms "first" and "second" are used to describe various elements, these elements should not be limited by these terms. These terms are used to distinguish one element from another. For example, a first element may be referred to as a second element, and vice versa.

SDN environment 100 includes multiple hosts 110A-B that are inter-connected via physical network 105. Each host 110A/110B may include suitable hardware 112A/112B and virtualization software (e.g., hypervisor-A 114A, hypervisor-B 114B) to support various virtual machines (VMs). For example, hosts 110A-B may support respective VMs 130-133. Hardware 112A/112B includes suitable physical components, such as central processing unit(s) (CPU(s)) or processor(s) 120A/120B; memory 122A/122B; physical network interface controllers (PNICs) 124A/124B; and storage disk(s) 126A/126B, etc. In practice, SDN environment 100 may include any number of hosts (also known as a "host computers", "host devices", "physical servers", "server systems", "transport nodes," etc.), where each host may be supporting tens or hundreds of VMs.

Hypervisor 114A/114B maintains a mapping between underlying hardware 112A/112B and virtual resources allocated to respective VMs. Virtual resources are allocated to respective VMs 130-133 to each support a guest operating system (OS) and application(s); see 140-143 and 150-153. For example, the virtual resources may include virtual CPU, guest physical memory, virtual disk, virtual network interface controller (VNIC), etc. Hardware resources may be emulated using virtual machine monitors (VMMs). For example in FIG. 1, VNICs 160-163 are virtual network adapters for VMs 130-133, respectively, and are emulated by corresponding VMMs (not shown for simplicity) instantiated by their respective hypervisor at respective host-A 110A and host-B 110B. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-B may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" (L2) may refer generally to a link layer or media access control (MAC) layer; "layer-3" (L3) to a network or Internet Protocol (IP) layer; and "layer-4" (L4) to a transport layer (e.g., using Transmission Control Protocol (TCP), User Datagram Protocol (UDP), etc.), in the Open System Interconnection (OSI) model, although the concepts described herein may be used with other networking models.

Hypervisor 114A/114B implements virtual switch 115A/115B and logical distributed router (DR) instance 117A/117B to handle egress packets from, and ingress packets to, corresponding VMs. In SDN environment 100, logical switches and logical DRs may be implemented in a distributed manner and can span multiple hosts. For example, logical switches that provide logical layer-2 connectivity, i.e., an overlay network, may be implemented collectively by virtual switches 115A-B and represented internally using forwarding tables 116A-B at respective virtual switches 115A-B. Forwarding tables 116A-B may each include entries that collectively implement the respective logical switches. Further, logical DRs that provide logical layer-3 connectivity may be implemented collectively by DR instances 117A-B and represented internally using routing tables (not shown) at respective DR instances 117A-B. The routing tables may each include entries that collectively implement the respective logical DRs.

Packets may be received from, or sent to, each VM via an associated logical port. For example, logical switch ports 170-173 are associated with respective VMs 130-133. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 115A-B in FIG. 1, whereas a "virtual switch" may refer generally to a software switch or software implementation of a physical switch. In practice, there is usually a one-to-one mapping between a logical port on a logical switch and a virtual port on virtual switch 115A/115B. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

Through virtualization of networking services in SDN environment 100, logical networks (also referred to as logical overlay networks) may be provisioned, changed, stored, deleted and restored programmatically without having to reconfigure the underlying physical hardware architecture. To facilitate logical network traffic among VMs 130-133, host 110A/110B may encapsulate and decapsulate packets with an outer header identifying a logical overlay network. For example, a logical overlay tunnel may be established between a pair of virtual tunnel endpoints (VTEPs) implemented by respective hosts 110A-B. For example, hypervisor-A 114A may implement a first VTEP (not shown) associated with (IP address=IP-A, MAC address=MAC-A, VTEP label=VTEP-A) and hypervisor-B 114B a second VTEP (not shown) with (IP-B, MAC-B, VTEP-B). Encapsulated packets may be sent via a logical overlay tunnel established between a pair of VTEPs over physical network 105, over which respective hosts 110A-B are in layer-3 connectivity with one another. Any suitable tunneling protocol may be used, such as Virtual eXtensible Local Area Network (VXLAN), Stateless Transport Tunneling (STT), Generic Network Virtualization Encapsulation (GENEVE), etc.

SDN controller 180 and SDN manager 184 are example network management entities in SDN environment 100. One example of an SDN controller is the NSX controller component of VMware NSX® (available from VMware, Inc.) that operates on a central control plane. SDN controller 180 may be a member of a controller cluster (not shown for simplicity) that is configurable using SDN manager 184 operating on a management plane. Network management entity 180/184 may be implemented using physical machine(s), VM(s), or both. Logical switches, logical routers, and logical overlay networks may be configured using SDN controller 180, SDN manager 184, etc. To send or receive control information, a local control plane (LCP) agent (not shown) on host 110A/110B may interact with central control plane (CCP) module 182 at SDN controller 180 via control-plane channel 101/102.

Example Network Element

Figure 2:
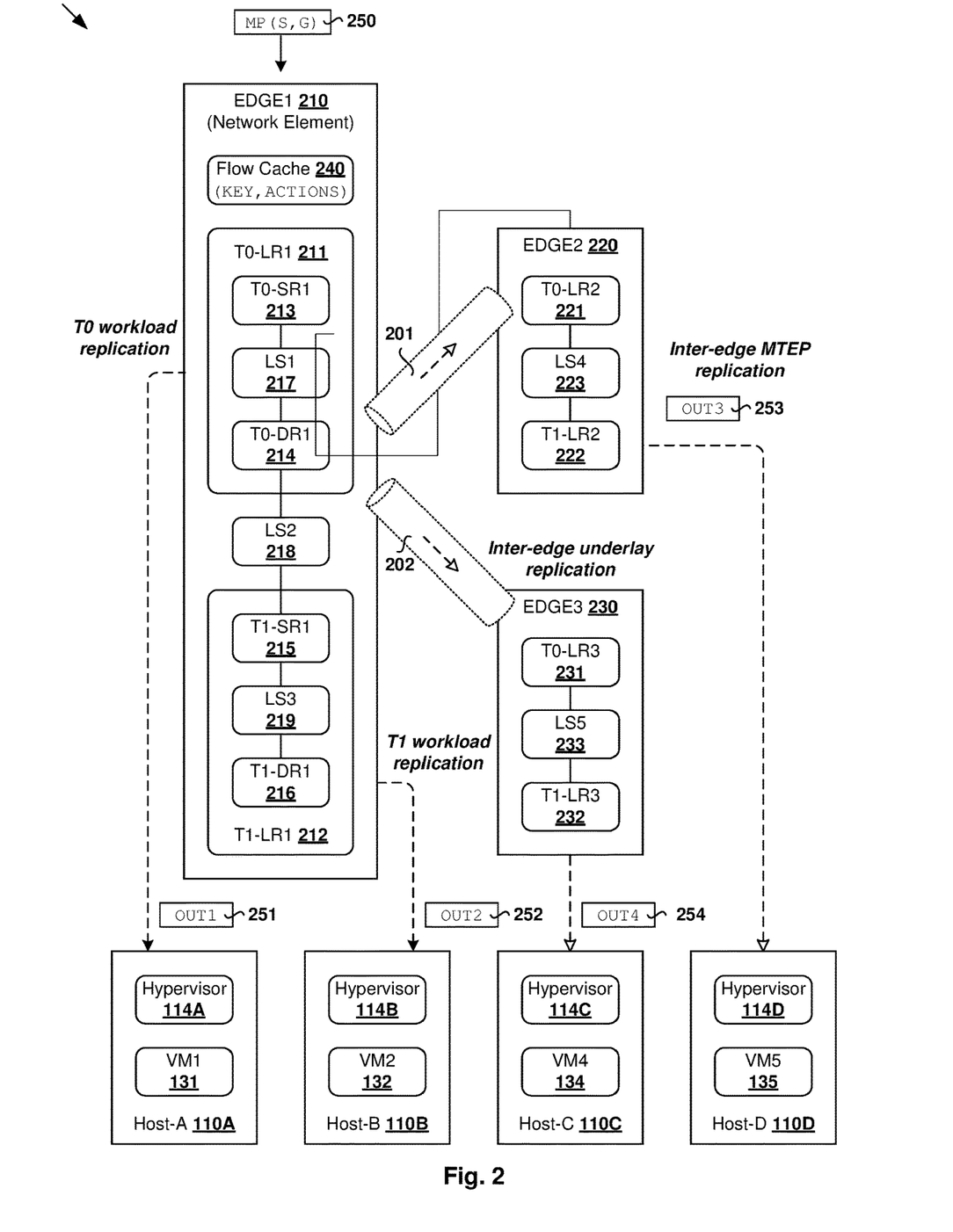
FIG. 2 is a schematic diagram illustrating example multicast packet handling by a network element based on flow cache information.

FIG. 2 is a schematic diagram illustrating example multicast packet handling 200 by network element 210 based on flow cache information. Compared to FIG. 1, additional transport nodes in the form of host-C 110C and host-D 110D are shown in FIG. 2. Host-C 110C supports hypervisor-C 114C and VM4 134, while host-D 110D supports hypervisor-D 114D and VM5 135. Host implementation details that have been explained using hosts 110A-B in FIG. 1 are also applicable to hosts 110C-D in FIG. 2 and will not be repeated here for brevity.

In the example in FIG. 2, various edge appliances (i.e., EDGE1 210, EDGE2 220 and EDGE3 230) may be deployed at the edge of different physical sites. EDGE1 210 may be connected with EDGE2 220 via first tunnel 201, while EDGE3 230 via second tunnel 202. Using a two-tier topology, each EDGE may support an upper tier-0 (T0) logical router (T0-LR) and a lower tier-1 (T1) logical router (T1-LR). In general, the upper T0 is associated with a data center provider and the lower T1 with a data center tenant. For example, logical routers denoted as T0-LR1 211 and T1-LR1 212 may be supported by EDGE1 210; T0-LR2 221 and T1-LR2 222 by EDGE2 220; and T0-LR3 231 and T1-LR3 232 by EDGE3 230. EDGE1 210 may be connected with an external network (not shown for simplicity) towards the north via T0-LR1 211. EDGE 210/220/230 may be implemented using VM(s) or bare metal server(s).

Each T0- or T1-LR may further include at least one distributed router (DR) and at least one service router (SR). In general, a logical DR is responsible for one-hop distributed routing between logical switches and/or logical routers. An SR is responsible for delivering services in a centralized manner, such as firewall, load balancing, network address translation (NAT), intrusion detection, deep packet inspection, etc. For example, on the upper tier, T0-LR1 211 at EDGE1 210 may include T0-SR1 213 and T0-DR 214 that are connected via LS1 217. On the lower tier, T1-LR1 212 may include T1-SR1 215 and T1-DR1 216 that are connected via LS3 219. Note that LS1 217 and LS3 219 are known as transit logical switches. A pair of T0 and T1 logical routers may also be connected via a transit logical switch (see 218/223/233 on EDGE 210/220/230). T1-DR1 216 may span multiple transport nodes, such as EDGE1 210 and host-B 110B.

In practice, it should be noted that a T0-DR may span across multiple edges (e.g., EDGE1 210, EDGE2 220 and EDGE3 230) for inter-edge multicast packet forwarding, such as inter-edge MTEP replication between EDGE1 210 and EDGE2 220 and inter-edge underlay replication between EDGE1 210 and EDGE3 230. The T0-SR on each of the three edges may be different from each other, or even absent in cases where north-bound connections on a specific edge is not required.

In the example in FIG. 2, EDGE1 210 ("network element" or "computer system") may be configured to perform multicast packet handling. For example, in response to detecting an ingress multicast packet (see "MP" 250) that is addressed from a multicast source (S) to a multicast group (G), EDGE1 210 may perform multicast packet handling to generate multiple (replicated) output packets (see 251-254). The output packets are destined for various multicast destinations associated with the multicast group. In practice, any suitable multicast destinations may be used, four examples of which will be discussed below using FIG. 2.

(a) At 251, EDGE1 210 may generate and forward a first output packet (see "OUT1") towards multicast destination=VM1 131 on host-A 110A. This is known as T0 workload replication, where host-A 110A is connected with T0-LR1 211 of EDGE1 210.

(b) At 254, EDGE1 210 may generate and forward a second output packet ("OUT2") towards VM2 132 on host-B 110B. This is known as T1 workload replication, where host-B 110B is connected with T1-LR1 212 of EDGE1 210. In this case, T1-LR1 212 may span multiple transport nodes, including host-B 110B and EDGE1 210.

(c) At 253, EDGE1 210 may generate and forward a third output packet (see "OUT3") towards EDGE2 220 for subsequent forwarding towards VM5 135 on host-D 110D. This is known as inter-edge multicast tunnel endpoint (MTEP) replication where EDGE1 210 and EDGE2 220 may reside on different underlay layer-2 VTEP segments. VM5 135 may be connected to a T1 DR that is in turn connected with a T1 SR (part of T1-LR2 222) on EDGE2 220.

(d) At 254, EDGE1 210 may generate and forward a fourth output packet (see "OUT4") towards EDGE3 230 for subsequent forwarding towards VM4 134 on host-C 110C. This is known as inter-edge underlay replication where EDGE1 210 and EDGE3 230 reside within the same underlay layer-2 VTEP segment (unlike EDGE2 220). VM4 134 may be connected to a T1 DR that is in turn connected with a T1 SR (part of T1-LR3 232) on EDGE2 220.

Conventionally, multicast packet handling is generally performed using "slow-path" processing (i.e., without any flow cache support) that might lead to a bottleneck on EDGE1 210 as the volume of multicast traffic increases. Slow-path processing may be costly and inefficiency because, inter alia, it is necessary to process many packet replications from a single multicast packet. In some cases, the multicast packet has to potentially go through a large number of checks and lookups against different datapath tables that are designed to cover different traffic types (including multicast and non-multicast traffic). Any inefficiency relating to multicast packet handling may in turn affect the performance of EDGEs 210-230 and hosts 110A-D in SDN environment 100.

Multicast Packet Handling Based on Flow Cache Information

According to examples of the present disclosure, EDGE1 210 may implement multicast packet handling more efficiently using flow cache information (see 240 in FIG. 2) associated with a multicast flow. In practice, flow cache information 240 may be configured for the multicast flow as a performance-boosting mechanism to facilitate fast-path processing. Flow cache information 240 may specify a set of actions that is configured based on a sequence of function calls that is executable during slow-path processing. The set of actions may include a replication action to generate packet replicas, and processing actions to generate and send multiple output packets towards different multicast destinations.

Throughout the present disclosure, the term "slow-path processing" may refer generally to multicast packet handling without any flow cache support. The term "fast-path processing" may refer generally to multicast packet handling with flow cache support, particularly by executing a set of actions specified by flow cache information. Compared to slow-path processing, fast-path processing may be implemented more efficiently because it is not necessary to, for example, perform lookups against different datapath tables that are designed for different traffic types. Such lookups are expensive to implement, especially for each and every multicast packet belonging to the same multicast flow. The term "function call" may refer generally to instructions or program code (e.g., function, subroutine, protocol, etc.) that are invocable or executable during slow-path processing. The term "action" may refer generally to operation(s) recorded in a flow cache for execution during fast-path processing.

Figure 3:
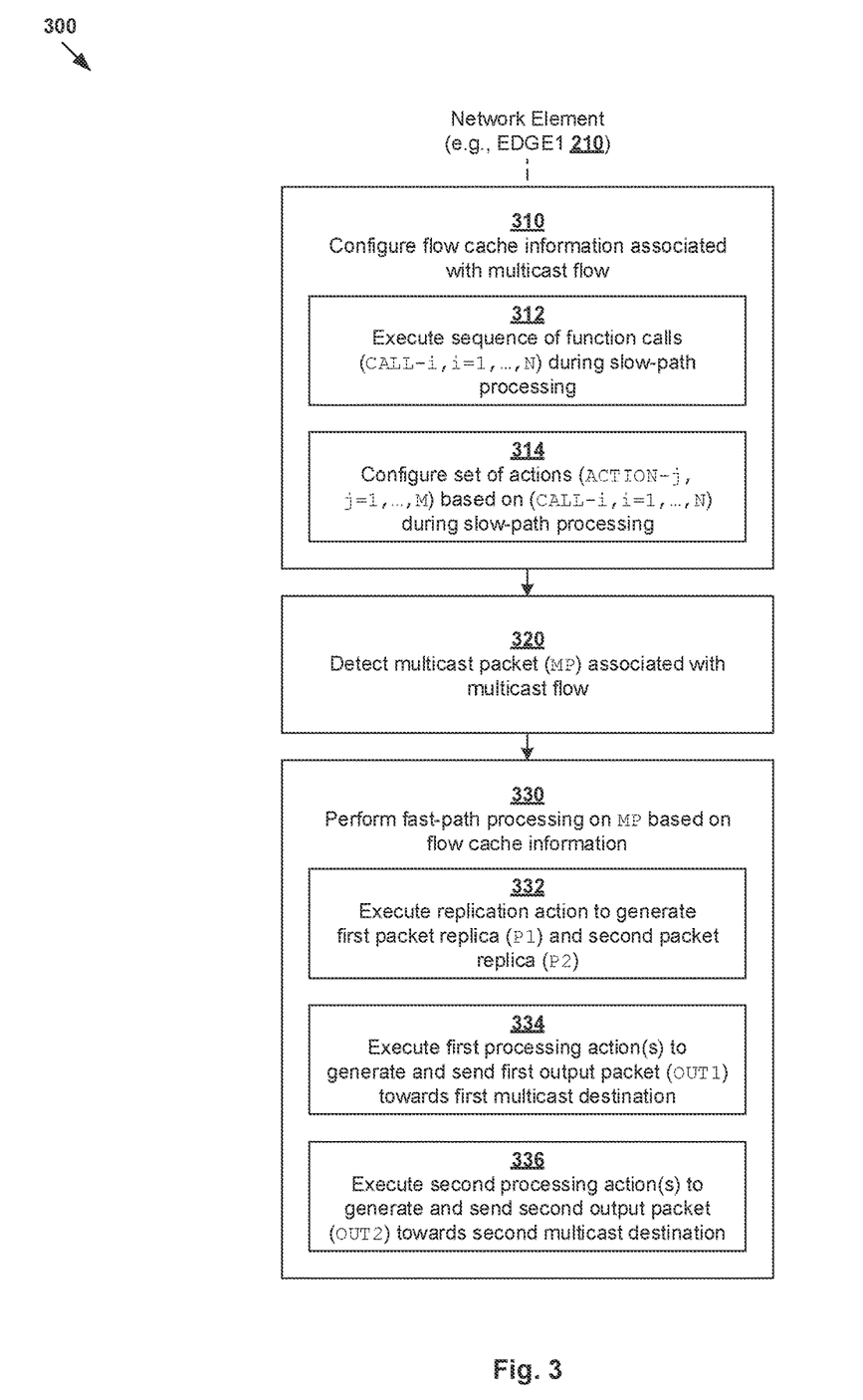
FIG. 3 is a flowchart of an example process for a network element to perform multicast packet handling based on flow cache information.

In more detail, FIG. 3 is a flowchart of example process 300 for a network element to perform multicast packet handling based on flow cache information.

Example process 300 may include one or more operations, functions, or actions illustrated by one or more blocks, such as 310 to 336. The various blocks may be combined into fewer blocks, divided into additional blocks, and/or eliminated depending on the desired implementation. In the following, various examples will be explained using EDGE1 210 as an example "network element," etc. In practice, examples of the present disclosure may be implemented by any suitable network element for multicast packet handling, not just an edge appliance.

At 310 in FIG. 3, EDGE1 210 may configure flow cache information associated with a multicast flow. The flow cache information may specify a set of actions (ACTION-j, where j=1, . . . , M) that is configured based on a sequence of function calls (CALL-i, where i=1, . . . , N) that is executable during slow-path processing. As will be described using FIGS. 4-5, slow-path processing may involve (a) executing the sequence of function calls arranged in a tree structure (e.g., replication tree) and (b) configuring the set of actions arranged in a flattened tree structure. See also 312-314.

At 320-330 in FIG. 3, in response to detecting a multicast packet (MP) associated with the multicast flow, fast-path processing may be performed on the multicast packet based on flow cache information 240. For example, fast-path processing may involve executing the set of actions (ACTION-j, where j=1, . . . , M) specified by flow cache information 240.

For example, at 332, a replication action may be executed to generate a first packet replica (P1) and a second packet replica (P2) from the multicast packet. At 334, first processing action(s) may be performed to process the first packet replica (P1) to generate and send a first output packet via a first interface, such as "OUT1" 251 towards a first multicast destination=VM1 131 on host-A 110A in FIG. 2. At 336, second processing action(s) may be performed to process the second packet replica (P2) to generate and send a second output packet via a second interface, such as "OUT2" 252 towards a second multicast destination=VM2 132 on host-B 110B.

As will be described using FIGS. 4-7, the replication action at block 332 and associated parameter value information may be configured based on execution of a replication function call during slow-path processing. The first or second processing action(s) at block 334-336 and associated parameter value information may be configured based on execution of one of the following: a (logical) routing or switching function call, an encapsulation or decapsulation function call and an output function call to forward an output packet via an interface (e.g., physical port) of EDGE1 210. A "processing action" may be performed to modify header and/or payload information of a packet. The set of actions may be configured based on execution of the sequence of function calls by one or more of the following: T0-SR1 213, T0-DR1 214, T1-SR1 215 and T1-DR1 216 on EDGE1 210.

Using examples of the present disclosure, flow cache information 240 may be configured to improve the efficiency and scalability of multicast packet handling. This way, the set of actions may be executed during fast-path processing to modify packet replicas and generate output packets before they are forwarded towards their respective multicast destinations. Fast-path processing at block 330 should be contrasted against slow-path processing, which involves the costly execution of sequence of function calls (e.g., require expensive lookups) for each and every multicast packet from the same multicast flow. Examples of the present disclosure may be implemented for multicast packet handling according to any suitable multicast replication tree of any shape, degree of replication and/or the level of replication. Various examples will be discussed below using FIG. 4 (detailed process), FIG. 5 (slow-path processing), FIG. 6 (flow cache information) and FIG. 7 (fast-path processing).

Slow-Path Processing (Recording Stage)

Figure 4:
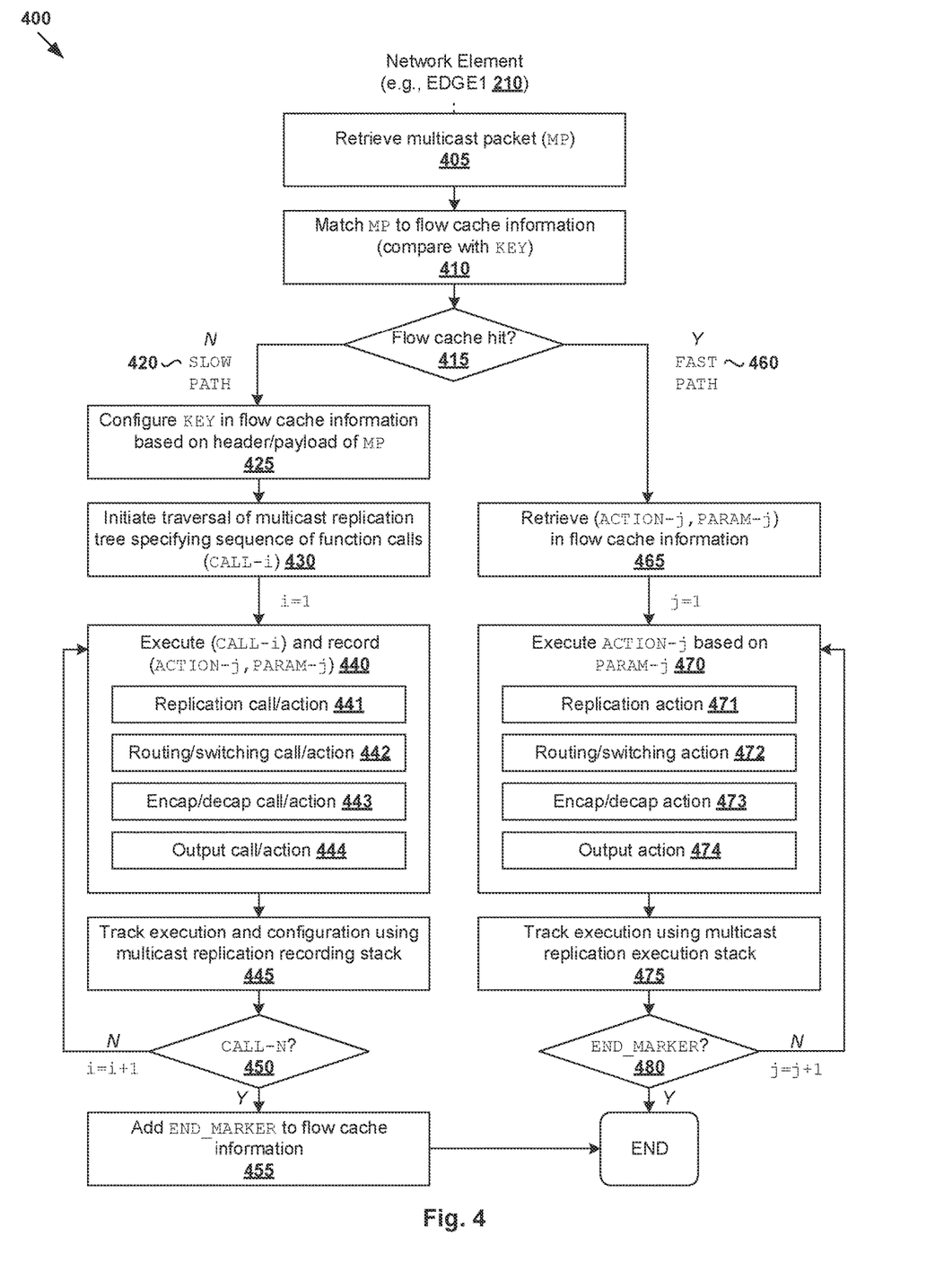
FIG. 4 is a flowchart of an example detailed process for a network element to perform multicast packet handling based on flow cache information.

FIG. 4 is a flowchart of example detailed process 400 for a network element to perform multicast packet handling based on flow cache information. Example process 400 may include one or more operations, functions, or actions illustrated at 405 to 480. The various operations, functions or actions may be combined into fewer blocks, divided into additional blocks, and/or eliminated depending on the desired implementation.

(a) Multicast Packet

At 405, 410 and 415 in FIG. 4, in response to detecting a (prior) multicast packet associated with a multicast flow, EDGE1 210 may determine whether the multicast packet may be matched to any flow cache information. At 420, in the case of a cache miss event (i.e., no match), EDGE1 210 may perform slow-path processing on the multicast packet and configure flow cache information for subsequent packet(s) from the same multicast flow. Otherwise, at 460, in the case of a cache hit event (i.e., match found), fast-path processing may be performed.

(b) Function Calls and Flow Cache Actions

At 425 in FIG. 4, EDGE1 210 may configure flow cache information that includes match fields (KEY) associated with a multicast flow to which the multicast packet belongs. The match fields may include header information extracted from the multicast packet. In practice, EDGE1 210 may support a memory-based flow cache for storing match fields (KEY) and a set of actions to expedite multicast packet handling during fast-path processing.

At 430 in FIG. 4, EDGE1 210 may initiate traversal of a multicast replication tree that includes a sequence of function calls (CALL-i, i=1, . . . , N) to be performed during slow-path processing. At 440, EDGE1 210 may execute (CALL-i, i=1, . . . , N) and configure flow cache information specifying an associated set of flow cache actions (ACTION-j, j=1, . . . , M). This way, an action (ACTION j) may be "recorded" along with parameter value information (PARAM-j) required for that action.

Any suitable action (ACTION-j) may be recorded based on execution of (CALL-i, i=1, . . . , N) across the edge topology, such as using T0-SR1 213, T0-DR1 214 and T1-SR1 215 on EDGE1 210. A particular "action" may be configured for packet replication, packet modification (e.g., header information modification relating to routing or switching, outer header encapsulation or decapsulation), output processing (forward via a physical interface of EDGE1 210), etc. See 441-444 in FIG. 4.

(c) Flow Cache Information

Figure 5:
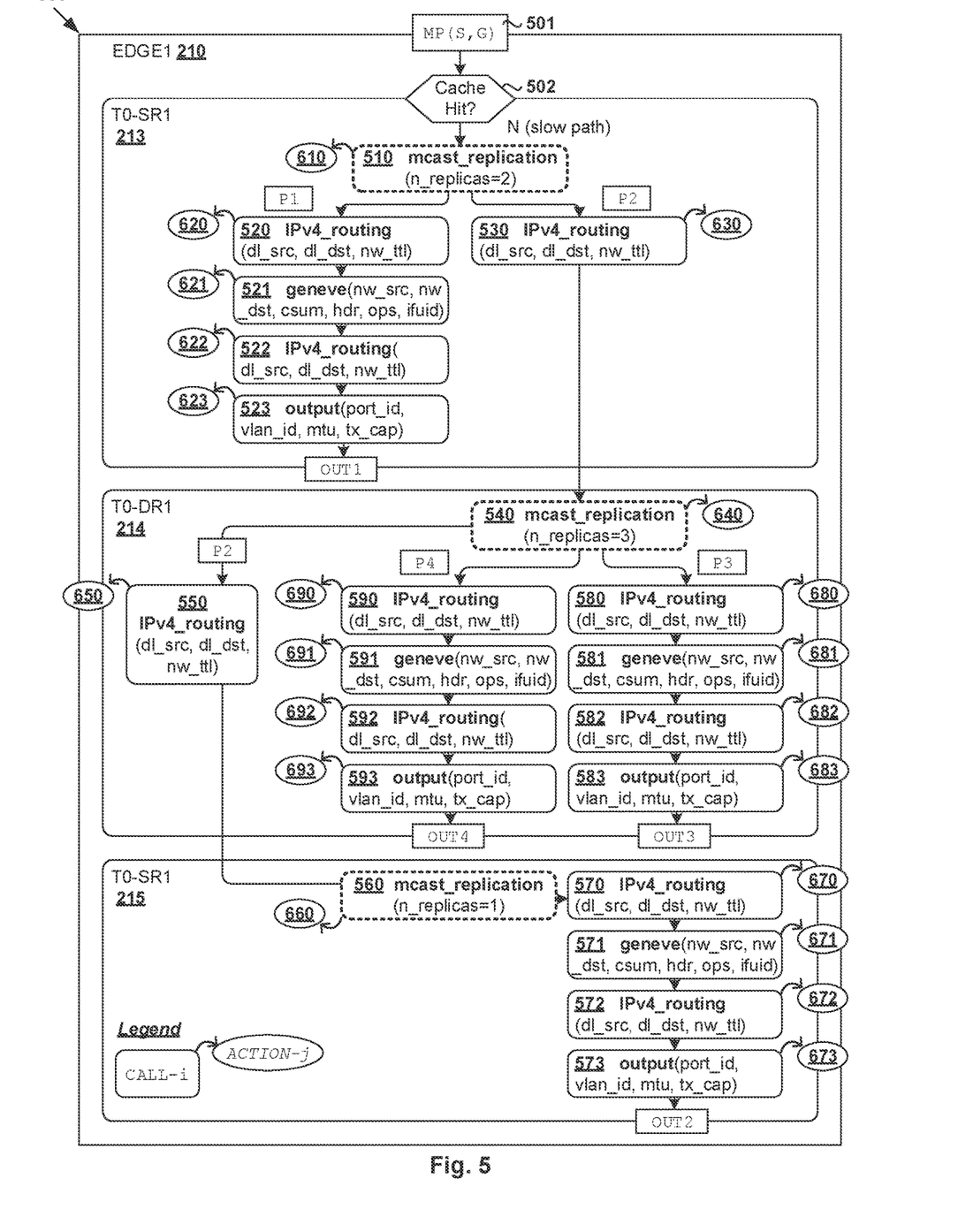
FIG. 5 is a schematic diagram illustrating an example slow-path processing for multicast packet handling.

In the following, slow-path processing will be explained using FIGS. 5-6, and fast-path processing using FIG. 7. In particular, FIG. 5 is a schematic diagram illustrating example slow-path processing 500 for multicast packet handling. FIG. 6 is a schematic diagram illustrating example flow cache information 600 that is configurable using the example in FIG. 5. For simplicity, flow cache information configuration will be explained using a one-to-one mapping for (CALL-i, ACTION-j) using N=M. In practice, one-to-many mapping may be used instead, such as recording multiple actions per call, one action per multiple calls, etc. Additionally, it is not necessary to configure flow cache action(s) for each and every function call executed during slow-path processing, in which case some function calls do not have any corresponding actions.

In the example in FIG. 5, a multicast replication process is represented using an arrow-connected multicast replication tree that is aligned with slow-path program calling sequence of function calls (see 510-593). Similar to the example in FIG. 2, a north-south multicast replication is shown with both T0 and T1 workload replications, as well as inter-edge MTEP replication to EDGE2 220 and inter-edge underlay multicast replication to EDGE3 230. During slow-path processing, a run-to-completion mode may be implemented where a multicast packet will be processed through the entire sequence of function calls. Note that function calls with the same name in FIG. 5 may have different parameter values.

In response to detecting a flow cache miss event (see 502), EDGE1 210 may process an ingress multicast packet (see 501) using the sequence of function calls until all required replications are completed. The multicast packet may be addressed from a multicast source (S) that resides on an external network to a multicast group (G). The multicast group may be associated with multiple members or destinations that have joined the group, such as VM1 131, VM2 132, VM4 134 and VM5 135 in FIG. 2.

At 510 in FIG. 5, EDGE1 210 may perform or execute a multicast replication function call "mcast_replication (n_replicas=2)," which is represented using a dashed box to indicate a replication point. Block 510 may be performed after a multicast route lookup on T0-SR1 213 on EDGE1 210. Parameter n_replicas specifies the number of packet replicas to be generated. Based on the replication function call, EDGE1 210 may generate two packet replicas. A first packet replica (P1) is to be processed using a one processing branch of the replication tree (see 520-523 at T0-SR1 213), and a second packet replica (P2) using another processing branch (see 530-593). At 610 in FIG. 5, based on the multicast replication function call, EDGE1 210 may record or configure action=mcast_replication( ) and parameter value information (n_replicas=2).

Recorded action 610 is also shown in FIG. 6 as part of example flow cache information 600 that specifies match fields (KEY) associated with the multicast flow. Example match fields (see 605) may include port ID information (e.g., port_id), virtual tunnel endpoint (TEP) information (e.g., num_teps, tunnel_ctxt), source MAC/IP address information (e.g., dl_src, nw_src), destination MAC/IP address information (e.g., dl_dst, nw_dst), ethertype (e.g., dl_type=0x800 for IPv4), virtual local area network (VLAN) information (e.g., vlan), network protocol parameters (e.g., nw_proto, nw_ttl, nw_flags), source/destination port information (e.g., tp_src, tp_dst), match type, or any combination thereof.

At 520-523 in FIG. 5, EDGE1 210 may process the first packet replica (P1) using a first processing branch. In more detail, at 520, function call="IPv4_routing( )" may be executed for routing and/or switching purposes, such as to modify MAC address information (see input parameters dl_src, dl_dst) and time-to-live (TTL) value (see nw_ttl). At 521, function call="geneve( )" may be executed to perform encapsulation (e.g., GENEVE outer header) based on various input parameters (see nw_src, nw_dst, csum, hdr, ops, ifuid). At 522, another function call="IPv4_routing( )" may be executed for routing and/or switching purposes. At 523, function call="output( )" may be executed to forward the output packet (OUT1) out of EDGE1 210, such as via a physical port associated with a VLAN according to a maximum transmission unit (MTU) and transmit (TX) offloading option (see port_id, vlan_id, mtu, tx_cap).

At 620-623 in both FIGS. 5-6, corresponding actions and parameter value information may be recorded in flow cache information 600 along with their parameter value information. For example, an "IPv4_routing" action (see 620) may be configured for execution based on source MAC address (dl_src=c2:81:09:00:00:01), destination MAC address (dl_dst=01:00:5e:01:04:03) and TTL value (nw_ttl=63). In another example, an "output" action (see 623) may be configured for execution during fast-path processing based on port_id=0, vlan_id=11, mtu=1500 and tx_cap=0xd.

Further, at 530-593 in FIG. 5, EDGE1 210 may process the second packet replica (P2) using a second processing branch that includes an "IPv4_routing( )" function call (see 530) and another "mcast_replication" function call (see 540) to generate n_replicas=3 packet replicas (labelled as P2, P3 and P4). The second packet replica (P2) may be processed using function calls 550, 560 and 570-573 to generate and send a second output packet (OUT2) via a physical port of EDGE1 210, such as towards VM2 132 on host-B 110B in FIG. 2.

Traversing upwards back to the "mcast_replication" function call (see 540), the third packet replica (P3) may be processed using function calls 580-583 to generate and send a third output packet (OUT3) via a physical port of EDGE1 210, such as towards VM5 135 on host-D 110D in FIG. 2. Finally, the fourth packet replica (P4) may be processed using function calls 590-593 to generate and send a fourth output packet (OUT4), such as towards VM4 134 on host-C 110C in FIG. 2. Similarly, at 630-693 in both FIGS. 5-6, corresponding actions and parameter value information may be recorded in flow cache information 600.

Depending on the desired implementation, flow cache optimization may be implemented. In one example, a "mcast_replication" action (see 660 in FIG. 6) may be excluded when n_replicas=1. This also helps collapsing the "IPv4_routing" action (see 650 in FIG. 6; not shown in detail for simplicity) for T1 workload replication. In another example, dynamic actions space may be implemented to handle more packet replications, such as for T1 multicast support where there might be a few dozens of replications.

(d) Multicast Replication Recording Stack

Depending on the desired implementation, a multicast replication recording stack (see 445 in FIG. 4) may be implemented to track (a) execution of function calls 510-593 and (b) configuration of actions 610-693 during slow-path processing. The multicast replication recording stack may grow and shrink as function calls 510-593 are executed. For example, the place of branching (i.e., at a branching point) as well as the place where replication is completed (i.e., at a leaf point) may be tracked using the multicast replication recording stack.

In the example in FIG. 5, replication function call 510 is known as a "branching point" (or "replication point") while output function call 523 may be referred to as a "leaf point." Once branching point 510 is reached, EDGE1 210 may record corresponding "mcast_replication" action 610 in flow cache information 600 and place the number of replications (e.g., n_replicas=2) into the multicast replication recording stack. This grows the multicast replication recording stack by one level.

Once leaf point 523 is reached, EDGE1 210 may record corresponding "output" action 623 and trace back up the multicast replication recording stack until a stack entry with unresolved replication(s) is found. On the way of tracing back in the multicast replication recording stack, the number of replications may be decremented by one. The above process of growing and shrinking the multicast replication recording stack may continue until the last leaf point (see 593 in FIG. 5) is reached. In this case, EDGE1 210 may trace back up towards a root level of the multicast replication recording stack to find all replications resolved.

(e) End Marker

In response to determination that all function calls 510-593 have been performed and corresponding actions 610-693 recorded, EDGE1 210 may add an end marker (see "END_MARKER" 694) to flow cache information 600 in FIG. 6. This also indicates the completion of slow-path processing. See also 450-455 in FIG. 4.

From the above examples, actions 610-693 in FIG. 6 may have a "flattened" tree structure compared to function calls 510-593 that arranged in a multicast replication tree structure in FIG. 5. During fast-path processing, the tree structure may be recovered based on actions 610-693, particularly using branching points (e.g., "mcast_replication" actions at 510 and 540) and leaf points (e.g., "output" actions at 523, 573, 583 and 593).

Fast-Path Processing (Execution Stage)

Once flow cache information 600 is configured, fast-path processing may be performed for subsequent multicast packet(s) belonging to the same multicast flow. Compared to the slow-path processing in FIG. 5, fast-path processing may be performed more efficiently by performing the set of recorded actions in FIG. 6. Some examples will be discussed using FIG. 7, which is a schematic diagram illustrating example fast-path processing 700 for multicast packet handling.

Figure 7:
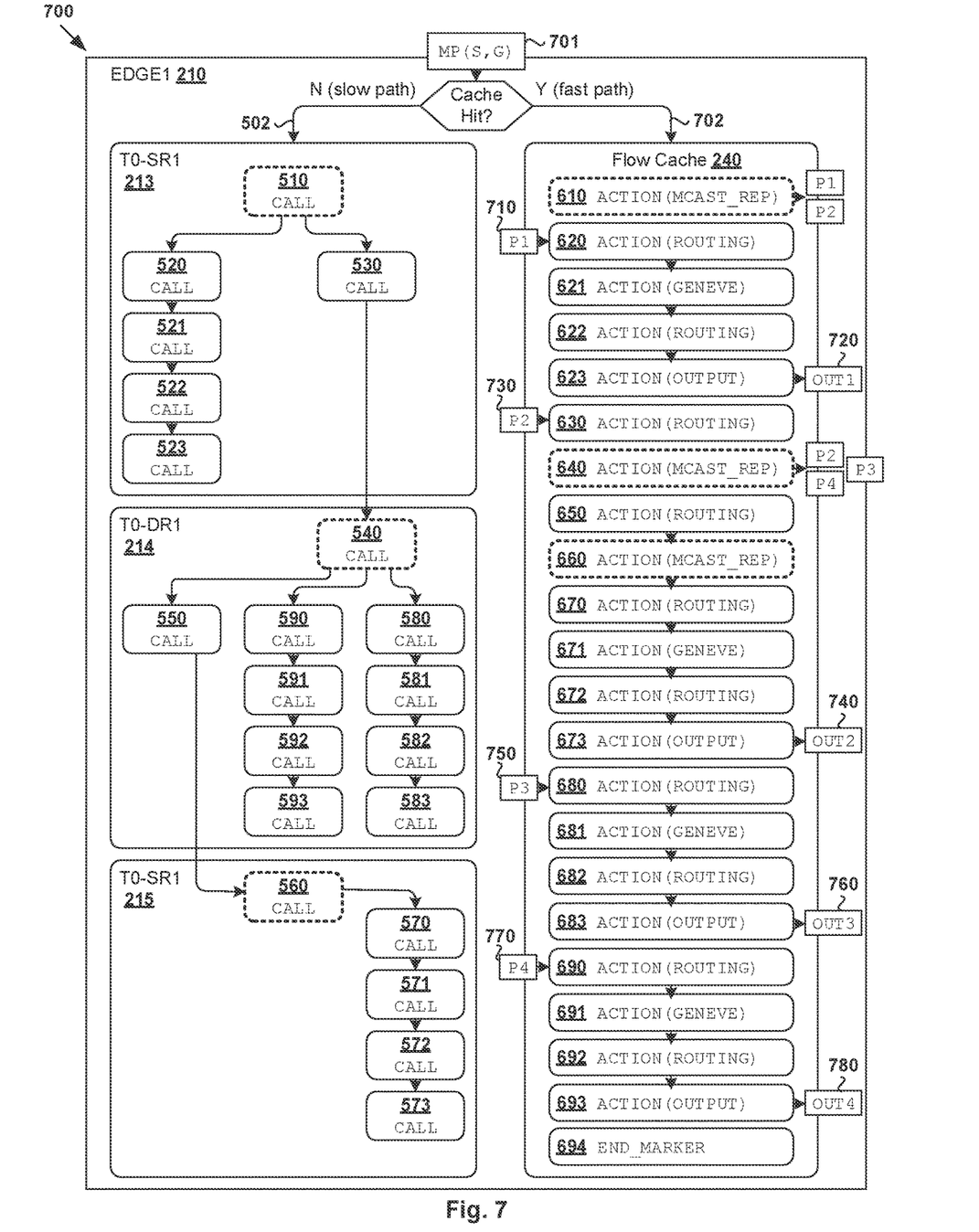
FIG. 7 is a schematic diagram illustrating an example fast-path processing for multicast packet handling.

In the example in FIG. 7, EDGE1 210 may receive a (subsequent) multicast packet (see 701) that belongs to the same multicast flow with the same pair of multicast source (S) and destination multicast group (G). In this case, EDGE1 210 may match the multicast packet to flow cache information 600 in FIG. 6 by comparing header and/or payload information of multicast packet 701 with match fields (KEY) at 605 in FIG. 6. If there is a match (i.e., cache hit), recorded actions 610-693 may be retrieved and executed to generate different output packets. Once end marker 694 is reached, fast-path processing is completed. See blocks 460, 465, 470, 475 and 480 in FIG. 4.

(a) Action Execution

Example actions 610-693 in FIG. 6 that are executable during fast-path processing are also shown in FIG. 7. Compared with slow-path processing using function calls 510-593 arranged in a tree structure, actions 610-693 have a flattened tree structure that may be executed more efficiently. During fast-path processing, actions 610-693 may be executed one at a time on a particular packet replica based on associated parameter value information in FIG. 6. Some examples are discussed below using various replication, routing, encapsulation and output actions according to blocks 471-474 in FIG. 4. Note that actions with similar names may have different parameter value information in FIG. 6.

First, replication action 610 in FIG. 7 may be performed to generate first packet replica (P1) and second packet replica (P2). At 710-720, actions 620-623 may be executed to process the first packet replica (P1) to generate and send first output packet=OUT1 730 via a physical port towards VM1 131 on host-A 110A. By executing routing action 630 and replication action 640, three packet replicas (P2, P3, P4) may be generated. At 730-740, the second packet replica (P2) may be processed using actions 650, 660 and 670-673 to generate and send a second output packet (OUT2) via a physical port of EDGE1 210, such as towards VM2 132 on host-B 110B.

At 750-760 in FIG. 7, the third packet replica (P3) may be processed using actions 680-683 to generate and send a third output packet (OUT3) via a physical port, such as towards VM5 135 on host-D 110D. Finally, at 770-780, the fourth packet replica (P4) may be processed using actions 690-693 to generate and send a fourth output packet (OUT4) towards VM4 134 on host-C 110C. END_MARKER 694 triggers the completion of fast-path processing.

During fast-path processing (also known as flow cache processing), note that the execution of actions 610-693 does not involve topological entities on EDGE1 210, such as T0-SR1 213, T0-DR1 214 and T1-SR1 215. In the example in FIG. 7, the topological entities are only used during slow-path processing, which provides network context information (e.g., router ID, virtual routing and forwarding (VRF) ID, VLAN ID, interface ID, lookup tables, etc.). The flow cache processing of a packet may be agnostic of those contexts. As described using FIGS. 5-6, relevant parameters (PARAM-j) required for the execution of an action (ACTION-j) are recorded in flow cache information 600 to improve efficiency during fast-path processing. Fast-path processing may be performed on the same CPU(s) where slow-path processing is implemented.

(b) Multicast Replication Execution Stack

Depending on the desired implementation, a multicast replication execution stack (see 475 in FIG. 4) may be implemented to track execution of actions 610-693 during fast-path processing. The multicast replication execution stack may grow and shrink as actions 610-693 are executed. Some examples are discussed below.

When executing a multicast replication action according to block 471 in FIG. 4, EDGE1 210 may generate packet replicas, such as by duplicating the current packet replica. Next, EDGE1 210 may store, in the multicast replication execution stack, a packet pointer to the duplicated copy may be stored along with the number of required replications (i.e., n_replicas). This grows the multicast replication execution stack by one level. Actions are then executed on the current packet replica.

Upon executing an output action according to block 474 in FIG. 4, EDGE1 210 may trace back up the multicast replication execution stack. Here, an additional packet copy may be duplicated from the stored packet pointer at a parent stack entry if more than one replication remains unresolved. This shrinks the multicast replication execution stack by one level. This way, as actions 610-693 are executed, the multicast replication execution stack may grow or shrink until END_MARKET 694 is reached.

Use Cases

Examples of the present disclosure may be implemented for any suitable multicast handling, such as north-south multicast replication, inter-edge MTEP replication and inter-edge underlay replication shown in FIGS. 2, 5-7. Other use cases may include south-north multicast replication (e.g., VM1 131 is a multicast source), east-west multicast replication (e.g., VM1 131 is a multicast source and VM2 132 is a multicast group member), GENEVE-in-VLAN-out, GENEVE-in-GENEVE-out, etc.

Container Implementation

Although explained using VMs, it should be understood that public cloud environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 7, container technologies may be used to run various containers inside respective VMs 130-135. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 7.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a network element to perform multicast packet handling based on flow cache information, wherein the method comprises:
    configuring flow cache information associated with a multicast flow, wherein the flow cache information specifies a set of actions that is configured based on a sequence of function calls that is executable during slow-path processing, and wherein configuring the flow cache information further includes in response to detecting a prior multicast packet associated with the multicast flow, performing the slow-path processing by (a) executing the sequence of function calls arranged in a tree structure and (b) configuring the set of actions arranged in a flattened tree structure; and
    in response to detecting a multicast packet associated with the multicast flow, performing fast-path processing on the multicast packet based on the flow cache information, wherein the fast-path processing includes:
        executing, from the set of actions, a replication action to generate a first packet replica and a second packet replica from the multicast packet;
        executing, from the set of actions, one or more first processing actions to process the first packet replica to generate and send a first output packet towards a first multicast destination via a first interface; and
        executing, from the set of actions, one or more second processing actions to process the second packet replica to generate and send a second output packet towards a second multicast destination via a second interface.

2. The method of claim 1, wherein configuring the flow cache information comprises one or more of the following:
    configuring the replication action and associated parameter value information based on execution of a replication function call to generate a first prior packet replica and a second prior packet replica from the prior multicast packet; and
    configuring a particular first or second processing action based on execution of one of the following: a routing or switching function call, an encapsulation or decapsulation function call and an output function call.

3. The method of claim 1, wherein configuring the flow cache information comprises:
    tracking (a) execution of the sequence of function calls and (b) configuration of the set of actions during the slow-path processing using a multicast replication recording stack by growing and shrinking the multicast replication recording stack as the sequence of function calls are executed.

4. The method of claim 1, wherein configuring the flow cache information comprises:
    based on the prior multicast packet, configuring the flow cache information to specify match fields associated with the multicast flow, wherein the match fields include one or more of the following: port identifier (ID) information, tunnel endpoint (TEP) information, source address information, destination address information, hardware type, virtual local area network (VLAN) information, network protocol parameters and source and destination port information.

5. The method of claim 1, wherein configuring the flow cache information comprises:
    configuring the set of actions based on execution of the sequence of function calls by one or more of the following logical routers supported by the network element in the form of an edge appliance: a tier-0 service router (T0-SR), a tier-0 distributed router (T0-DR), a tier-1 service router (T1-SR) and a tier-1 distributed router (T1-DR).

6. The method of claim 1, wherein performing the fast-path processing comprises:
    tracking execution of the set of actions during the fast-path processing using a multicast replication execution stack by growing and shrinking the multicast replication execution stack as the set of actions are executed.

7. A non-transitory computer-readable storage medium that includes a set of instructions which, in response to execution by a processor of a computer system, cause the processor to perform a method of multicast packet handling based on flow cache information, wherein the method comprises:
    configuring flow cache information associated with a multicast flow, wherein the flow cache information specifies a set of actions that is configured based on a sequence of function calls that is executable during slow-path processing, and wherein configuring the flow cache information further includes in response to detecting a prior multicast packet associated with the multicast flow, performing the slow-path processing by (a) executing the sequence of function calls arranged in a tree structure and (b) configuring the set of actions arranged in a flattened tree structure; and in response to detecting a multicast packet associated with the multicast flow, performing fast-path processing on the multicast packet based on the flow cache information, wherein the fast-path processing includes:

executing, from the set of actions, a replication action to generate a first packet replica and a second packet replica from the multicast packet;

executing, from the set of actions, one or more first processing actions to process the first packet replica to generate and send a first output packet towards a first multicast destination via a first interface; and executing, from the set of actions, one or more second processing actions to process the second packet replica to generate and send a second output packet towards a second multicast destination via a second interface.

8. The non-transitory computer-readable storage medium of claim 7, wherein configuring the flow cache information comprises one or more of the following:

configuring the replication action and associated parameter value information based on execution of a replication function call to generate a first prior packet replica and a second prior packet replica from the prior multicast packet; and configuring a particular first or second processing action based on execution of one of the following: a routing or switching function call, an encapsulation or decapsulation function call and an output function call.

9. The non-transitory computer-readable storage medium of claim 7, wherein configuring the flow cache information comprises:

tracking (a) execution of the sequence of function calls and (b) configuration of the set of actions during the slow-path processing using a multicast replication recording stack by growing and shrinking the multicast replication recording stack as the sequence of function calls are executed.

10. The non-transitory computer-readable storage medium of claim 7, wherein configuring the flow cache information comprises:

based on the prior multicast packet, configuring the flow cache information to specify match fields associated with the multicast flow, wherein the match fields include one or more of the following: port identifier (ID) information, tunnel endpoint (TEP) information, source address information, destination address information, hardware type, virtual local area network (VLAN) information, network protocol parameters and source and destination port information.

11. The non-transitory computer-readable storage medium of claim 7, wherein configuring the flow cache information comprises:

configuring the set of actions based on execution of the sequence of function calls by one or more of the following logical routers supported by the network element in the form of an edge appliance: a tier-0 service router (T0-SR), a tier-0 distributed router (T0-DR), a tier-1 service router (T1-SR) and a tier-1 distributed router (T1-DR).

12. The non-transitory computer-readable storage medium of claim 7, wherein performing the fast-path processing comprises:

tracking execution of the set of actions during the fast-path processing using a multicast replication execution stack by growing and shrinking the multicast replication execution stack as the set of actions are executed.

13. A network element, comprising:

a first physical interface;

a second physical interface; and a processor to:

configure flow cache information associated with a multicast flow, wherein the flow cache information specifies a set of actions that is configured based on a sequence of function calls that is executable during slow-path processing, and wherein the processor is to configure the flow cache information by performing the following: in response to detecting a prior multicast packet associated with the multicast flow, perform the slow-path processing by (a) executing the sequence of function calls arranged in a tree structure and (b) configuring the set of actions arranged in a flattened tree structure; and in response to detecting a multicast packet associated with the multicast flow, perform fast-path processing on the multicast packet based on the flow cache information, wherein the fast-path processing includes the following:

execute, from the set of actions, a replication action to generate a first packet replica and a second packet replica from the multicast packet;

execute, from the set of actions, one or more first processing actions to process the first packet replica to generate and send a first output packet towards a first multicast destination via the first physical interface; and execute, from the set of actions, one or more second processing actions to process the second packet replica to generate and send a second output packet towards a second multicast destination via the second physical interface.

14. The network element of claim 13, wherein the processor is to configure the flow cache information by performing one or more of the following:

configure the replication action and associated parameter value information based on execution of a replication function call to generate a first prior packet replica and a second prior packet replica from the prior multicast packet; and configure a particular first or second processing action based on execution of one of the following: a routing or switching function call, an encapsulation or decapsulation function call and an output function call.

15. The network element of claim 13, wherein the processor is to configure the flow cache information by performing the following:

track (a) execution of the sequence of function calls and (b) configuration of the set of actions during the slow-path processing using a multicast replication recording stack by growing and shrinking the multicast replication recording stack as the sequence of function calls are executed.

16. The network element of claim 13, wherein the processor is to configure the flow cache information by performing the following:
- based on the prior multicast packet, configure the flow cache information to specify match fields associated with the multicast flow, wherein the match fields include one or more of the following: port identifier (ID) information, tunnel endpoint (TEP) information, source address information, destination address information, hardware type, virtual local area network (VLAN) information, network protocol parameters and source and destination port information.

17. The network element of claim 13, wherein the processor is to configure the flow cache information by performing the following:
- configure the set of actions based on execution of the sequence of function calls by one or more of the following logical routers supported by the network element in the form of an edge appliance: a tier-0 service router (T0-SR), a tier-0 distributed router (T0-DR), a tier-1 service router (T1-SR) and a tier-1 distributed router (T1-DR).

18. The network element of claim 13, wherein the processor is to perform the fast-path processing by performing the following:
- track execution of the set of actions during the fast-path processing using a multicast replication execution stack by growing and shrinking the multicast replication execution stack as the set of actions are executed.

* * * * *